Patented Dec. 22, 1942

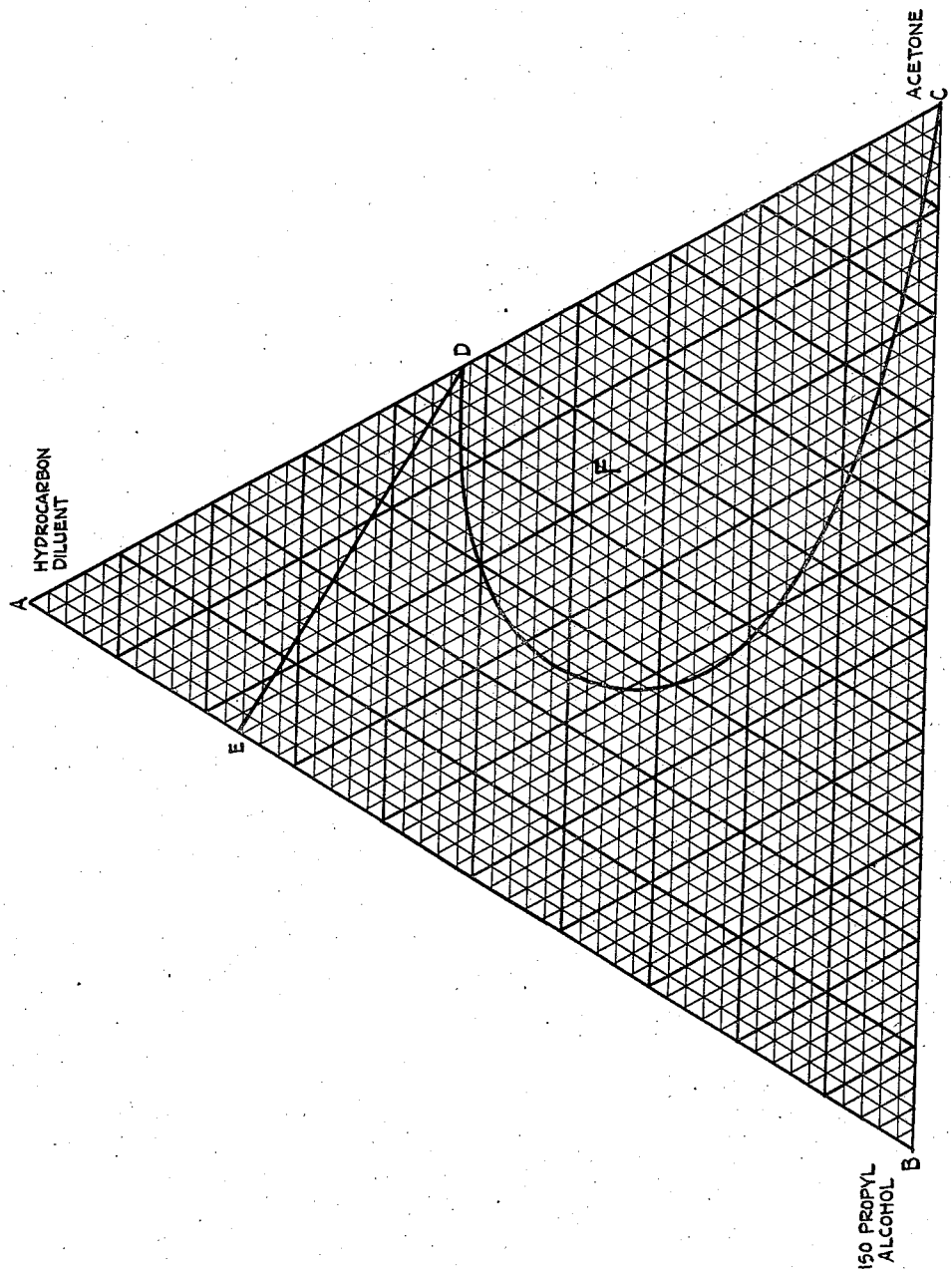

2,306,114

UNITED STATES PATENT OFFICE 2,306,114

SPIRIT VARNISH SOLVENT AND THINNER

Franklin A. Bent, Berkeley, and William L. Ponig, San Francisco, Calif., assignors to Shell Development Company, San Francisco, Calif., a corporation of Delaware Application April 19, 1940, Serial No. 330,542

5 Claims. (Cl. 106—237)

This invention relates to compositions of matter useful as solvents for natural resins in the preparation of spirit varnishes and varnish thinners, and relates particularly to improved solvent mixtures comprising ketones, alcohols and hydrocarbon diluents.

Spirit varnishes find wide application where a pale, transparent, quick-drying protective coating is desired as, for example, for coating of lithographed labels, for finishing oil paintings and metal surfaces, especially burnished surfaces, to prevent tarnishing. Heretofore spirit varnishes have generally been composed of a natural resin dissolved in denatured ethyl alcohol. When natural resins are dissolved there remains an insoluble residue consisting of foreign refuse matter and a transparent gelatinous material. An essential requirement of a suitable solvent is that the time required to settle insoluble residue be a minimum. It is furthermore often essential that the solvent have the ability to vaporize rapidly without impairing the quality of the coating. The latter characteristic is of especial importance in operations such as those involving the coating of lithographed materials wherein the coated materials must be stacked after drying. The output in such operations is greatly influenced by the time required for the varnish to dry sufficiently to permit stacking without damage to the coating. Solvents for such use must have no lifting action on lithograph inks. Spirit varnishes as prepared with solvents available heretofore at reasonable cost have been substantially lacking in desired qualities particularly in respect to the drying rate and the gloss of the dried film.

It is an object of the present invention to provide a liquid solvent mixture which has a high solvent power for natural resins and forms therewith solutions of high concentration and low viscosity resulting in the deposition of films of the natural resin having a high gloss and which are clear, tough and homogeneous.

Another object of the invention is to provide a solvent mixture having a high solvency for spirit varnish resins suitable for the manufacture of rapid drying spirit varnishes substantially devoid of any lifting action on lithographed inks and resulting in a clear film having a high gloss and free from tendency to stick when dried.

A further object of the invention is the provision of solvent mixtures comparatively low in cost having a high solvent power for natural spirit varnish resins and forming solutions therewith requiring a minimum time for the separation therefrom of insoluble residue.

We have found a solvent mixture comprising three components, namely, an alcohol, a ketone and a hydrocarbon diluent as, for example, a mixture comprising acetone, isopropyl alcohol and an aliphatic hydrocarbon diluent, to be an excellent solvent for natural resins. By proper control of composition of the mixture in accordance with the invention, liquid solvent mixtures are obtained possessing all of the above-mentioned characteristics desired in a spirit varnish solvent. Natural resins from any source may be used as the resins for which the solvent mixtures of the invention serve as vehicles and may comprise, for example, gum accroides, galipot, gum benzoe, pontianac, Manila copal, sandarac, dammar C; resins obtained by purification of natural products, such as rosins, shellac, etc.

In order that the invention may be clearly understood, it will be described with reference to a solution of a specific natural resin, for example, Manila Loba DBB resin (sometimes designated as East India DBB gum), in one specific ternary system in accordance with the invention, for example, acetone-isopropyl alcohol-hydrocarbon diluent. The hydrocarbon diluent preferably consists of a hydrocarbon mixture predominating in saturated aliphatic hydrocarbons and having a specific gravity of, for example, about 0.75. The description of the illustrative example of the invention will be made with reference to the attached single drawing forming part of this specification.

In the drawing the limiting solubility of Manila Loba gum, in 50% concentration by weight, in systems composed of the three components of the illustrative ternary system have been plotted on triangular coordinates. The apexes A, B, and C of the triangular diagram represent 100% of each component of the ternary system hydrocarbon diluent-isopropyl alcohol-acetone, respectively.

In the drawing all compositions below curve E—D will dissolve at least 50% by weight of the gum. Although solvent mixtures of the composition as defined by any point below line E—D may function as a solvent for the gum, these embrace compositions varying greatly in characteristics. A particular composition selected as a desired solvent mixture or thinner will depend upon the nature of the spirit varnish desired and the use to which it is to be put. In any case desirable solvent mixtures will comprise at least about 20 to 25% by volume of the hydrocarbon diluent. It will obviously be generally uneconomical to have a content of either acetone or isopropyl alcohol to an extent where these components function merely as a diluent. Suitable solvent mixtures will generally comprise an acetone content below for, example, about 65% by volume, and an isopropyl alcohol content below, for example, about 65% by volume. The composition chosen will depend upon the excess tolerance required in the solvent mixture, that is, the amount of additional solvent which may be added to one pound of mixture before causing separation of dissolved gum.

A suitable solvent mixture may, for example, consist of

*Example I*

| | Per cent by volume |
|---|---|
| Acetone | 10–65 |
| Isopropyl alcohol | 1–65 |
| Hydrocarbon diluent | 20–75 |

It has been pointed out above that the time required to settle out insoluble residue from the resulting resin solution is an important factor in determining the value of the resin solvent. An important feature toward which the invention is particularly directed is the provision of solvent mixtures which enable the separation of insoluble matter from the resulting natural resin solution at a substantially faster rate than it has been able to attain with the use of solvents disclosed heretofore. We have found this quality is possessed by compositions as defined by points within area F embraced by curve D—C in the diagram of the drawing. Suitable solvent mixtures forming natural resin solutions requiring a minimum time for the separation therefrom of insoluble residue may comprise about 25% to about 70% by volume of acetone, about 1% to about 42% by volume of isopropyl alcohol and about 10% to about 52% by volume of a saturated aliphatic hydrocarbon diluent.

A further advantage in the use of solvent mixtures in accordance with the invention resides in possibility of adjusting the composition thereof within the scope of the invention to obtain solvents for natural resins resulting in a spirit varnish requiring a minimum time of evaporation leaving a homogeneous, non-sticking, film having a high gloss. Suitable solvent mixtures possessing the quality of evaporating at a rate in excess of that required for example, by a spirit varnish of similar concentration obtained by the use of ethyl alcohol as the solvent, may comprise, for example, about 10% to about 65% by volume of acetone, about 1% to about 40% by volume of isopropyl alcohol and about 25% to about 65% of a paraffinic hydrocarbon diluent.

Examples of typical mixtures comparatively low in cost, forming rapid-drying solutions with natural resins requiring a minimum time for the separation therefrom of insoluble residue and having substantially no lifting effect on lithograph inks are the following:

*Example II*

| | Per cent by volume |
|---|---|
| Acetone | 40 |
| Isopropyl alcohol | 20 |
| Hydrocarbon diluent | 40 |

*Example III*

| | Per cent by volume |
|---|---|
| Acetone | 36 |
| Isopropyl alcohol | 18 |
| Hydrocarbon diluent | 46 |

Although the illustrative example of my invention has been directed to a ternary system comprising acetone as the ketone component, the invention is not limited thereto. Acetone may, for example, be replaced by methyl-ethyl-ketone, and solvent mixtures having the described desired characteristics may comprise, for example, about 30% to about 50% by volume of methyl-ethyl ketone, 15% to about 25% isopropyl alcohol and about 35% to about 45% of a paraffinic hydrocarbon diluent. A typical example of a mixture especially suited as a solvent for natural spirit varnish resins resulting in the deposition of films having a high gloss is as follows:

*Example IV*

| | Per cent by volume |
|---|---|
| Methyl-ethyl ketone | 30–50 |
| Isopropyl alcohol | 15–25 |
| Hydrocarbon diluent | 35–45 |

It is to be understood that the invention is not limited to ternary mixtures comprising specific components mentioned in the illustrative description of the invention nor is it limited to the preferred solvent mixtures suitable to the production of rapid-drying spirit varnishes. Specific components of ternary systems within the scope of the invention comprising a ketone, an alcohol and a hydrocarbon diluent may be selected from a great number of ketones and alcohols capable of functioning as solvents for natural resins. The particular components selected will be governed by the characteristics of the solvent or diluent mixture desired. Thus solvent or diluent mixtures suitable for the manufacture of natural resin spirit varnishes in accordance with the invention may comprise an aliphatic, carbocyclic or aromatic ketone. Suitable ketones are, for example, saturated aliphatic ketones such as methyl-propyl ketone, methyl-isopropyl ketone, diethyl ketone, ethyl-propyl ketone, methyl-n-butyl ketone. methyl-secondary butyl ketone, methyl-tertiary butyl ketone, dipropyl ketone, di-isopropyl ketone, propyl-isopropyl ketone, ethyl-butyl ketone, methyl-amyl ketone, di-isobutyl ketone, methyl-n-hexyl ketone and higher homologues and unsaturated ketones, such as methyl vinyl ketone, vinyl acetone, allyl acetone, mesityl oxide, propyl-allyl ketone, etc., cyclic and aromatic ketones such as cyclobutanone, cyclopentanone, cyclohexanone, acetophenone, benzophenone, etc. Suitable alcohols comprise methyl alcohol, ethyl alcohol, normal, secondary and tertiary butyl alcohols, secondary amyl alcohol, methyl amyl alcohol, etc. Hydrocarbon diluents suitable as components in the solvent mixture in accordance with the invention may comprise any hydrocarbon or mixture of hydrocarbons which is tolerated by the resin solution.

If desired, resort may be had to the use of more than one ketone or more than one alcohol to constitute the ketone and alcohol components respectively of the solvent mixture in accordance with the invention. This means may be resorted to to aid in the control of the evaporation rate.

Many widely differing embodiments in the invention may be made without departing from the spirit and scope thereof and it is not intended to be limited except as indicated in the appended claims.

We claim as our invention:

1. A rapid-drying spirit varnish which on drying leaves a clear, tough, homogeneous coating film of high gloss, said varnish comprising a natural resin dissolved in a liquid solvent mixture which consists of from 30% to 50% by volume of methyl ethyl ketone, 15% to 25% by volume of isopropyl alcohol, and 35% to 45% by volume of a hydrocarbon diluent.

2. A rapid-drying spirit varnish which on drying leaves a clear, tough, homogeneous coating film of high gloss, said varnish comprising a natural resin dissolved in a liquid solvent mixture which consists of from 36% to 40% by volume of acetone, 18% to 20% by volume of isopropyl alcohol, and 40% to 46% by volume of a hydrocarbon diluent.

3. A rapid-drying spirit varnish which on drying leaves a clear, tough, homogeneous coating film of high gloss, said varnish comprising a natural resin dissolved in a liquid solvent mixture which consists of from 25% to 65% by volume of acetone, 1% to 40% by volume of isopropyl alcohol, and from 25% to 52% of a hydrocarbon diluent.

4. A rapid-drying spirit varnish which on drying leaves a clear, tough, homogeneous coating film of high gloss, said varnish comprising a natural resin dissolved in a liquid solvent mixture which consists of from 10% to 65% by volume of an aliphatic ketone, 1% to 65% by volume of an aliphatic alcohol, and 10% to 76% by volume of a hydrocarbon diluent.

5. A rapid-drying spirit varnish which on drying leaves a clear, tough, homogeneous coating film of high gloss, said varnish comprising a natural resin dissolved in a liquid solvent mixture which consists of from 10% to 65% by volume of a ketone, 1% to 65% by volume of an aliphatic alcohol, and 10% to 76% by volume of a hydrocarbon diluent.

FRANKLIN A. BENT.
WILLIAM L. PONIG.